Nov. 8, 1966 R. F. PFOST 3,283,396

MAGNETIC TRANSDUCER ASSEMBLY AND MANUFACTURE

Original Filed April 17, 1961 3 Sheets-Sheet 1

ROBERT F. PFOST
INVENTOR.

BY Robert H. Clay
ATTORNEY

Nov. 8, 1966 R. F. PFOST 3,283,396

MAGNETIC TRANSDUCER ASSEMBLY AND MANUFACTURE

Original Filed April 17, 1961 5 Sheets-Sheet 2

ROBERT F. PFOST
INVENTOR.

BY Robert S. Clay

ATTORNEY

Nov. 8, 1966 R. F. PFOST 3,283,396

MAGNETIC TRANSDUCER ASSEMBLY AND MANUFACTURE

Original Filed April 17, 1961 3 Sheets-Sheet 3

ROBERT F. PFOST
INVENTOR.

BY Robert G. Clay

ATTORNEY

United States Patent Office
3,283,396
Patented Nov. 8, 1966

3,283,396
MAGNETIC TRANSDUCER ASSEMBLY AND MANUFACTURE

Robert F. Pfost, Mountain View, Calif., assignor to Ampex Corporation, Redwood City, Calif., a corporation of California Original application Apr. 17, 1961, Ser. No. 103,424. Divided and this application May 12, 1964, Ser. No. 377,445
3 Claims. (Cl. 29—155.5)

This is a division of application Serial No. 103,424 filed April 17, 1961.

This invention relates to a method and means for manufacturing magnetic transducers, and in particular to a method and means for making and employing magnetic heads formed substantially from a ferrite material.

Ferrites are highly preferable for use as cores of magnetic transducers or heads because they are relatively hard, afford lower losses during the recording and reproducing modes, and operate well at high frequencies. When techniques normally utilized for construction of magnetic tape transducers from metallic magnetic materials and specifically, the techniques of forming the nonmagnetic gap are employed in the construction of a magnetic tape transducer intended for contact recording, such a transducer assembly being formed from ferrite, the well-defined, sharp corners of the ferrite material at the junction formed by the nonmagnetic gap and the ferrite have a tendency to chip and crack and, in general, erode away until satisfactory operation of the transducer is no longer possible due to poor resolving power.

In the prior art, heads utilizing ferrite cores have been made with metallic pole places, such as Alfenol, disposed on either side of the nonmagnetic gap to provide a mechanically strong structure. However, such a head structure is subject to rapid wear requiring frequent replacement when operating in contact with magnetic tapes, especially at high relative speeds. Furthermore, changes in structure of the head due to abrasion and wear vary the resolution and sensitivity characteristics of the head. In addition, the manufacture of such heads is tedious, time-consuming and uneconomical because they must be manufactured individually to provide proper gap dimensions.

It has been proposed to employ a glass bond or embedment to form the nonmagnetic gap of a ferrite core transducer to provide improved head wear resistance, to minimize gap erosion, and to provide improved gap definition, better resolution and greater sensitivity. But the manufacture of glass gap heads for use in video, television or high frequency magnetic tape apparatus necessitates special techniques. For example, in a television tape recorder that utilizes a plurality of expensive magnetic heads having relatively narrow gaps disposed circumferentially on a rotary drum, the heads need be perfectly aligned and properly adjusted to avoid phasing errors and improper head-to-tape contact. Therefore, it would be desirable to provide a method for manufacturing ferrite core magnetic heads by mass production methods wherein all the heads have substantially the same precise configuration, and still derive the advantages and features of a ferrite core head having a gap formed by means of a glass bond.

An object of this invention is to provide a novel and improved method for manufacturing a magnetic transducer utilizing a ferrite material as the core.

Another object of this invention is to provide an improved method for forming a ferrite core transducer having a relatively narrow nonmagnetic gap with a nonmagnetic rigid material disposed in the gap to provide structural strength.

Another object is to provide a method for manufacturing precisely formed ferrite core heads having accurate gap dimensions on a mass production basis in an economical manner.

Another object of this invention is to provide a method for forming a magnetic transducer having a ferrite core and a glass gap, such glass forming a chemical bond so as to establish a substantially continuous molecular structure but a discontinuous magnetic structure.

According to this invention, a plurality of lapped and polished ferrite slabs of high density and low porosity have a series of spacer layers or strips deposited on one surface, the thickness of such layers determining the gap length of a finished transducer. A like plurality of similar ferrite slabs are coated with a thin layer of glass on a corresponding surface, such glass having a coefficient of thermal expansion essentially the same as that of the ferrite material. All the slabs are sliced transversely to the parallel spacer strips into ferrite blocks. Each ferrite block having spacer strips is fused to a block having a glass layer, by heating the glass to melting while the blocks are clamped under high pressure in a neutral atmosphere. After cooling, the joined blocks are severed along the spacer strips to provide transducer size units having a nonmagnetic glass gap ready for further shaping and assembly. The shaped and finished transducer assemblies are all substantially uniform in dimension and physical characteristics, and a multiplicity of such mechanically stable transducers may be mounted in equally spaced relation about the periphery of a rotary drum assembly of a magnetic tape apparatus to provide recording and reproducing operation that has high resolution and improved sensitivity.

In an embodiment of this invention, a ferrite material having relatively high density and low porosity is cut and lapped into rectangular type slabs, which are polished and then heated to eliminate any contaminants. A plurality of parallel layers of spacer material having a high melting point are deposited longitudinally on one surface of half of the slabs, and a thin layer of glass having a relatively low melting temperature is deposited coextensively on a corresponding surface of the other half of the slabs. The slabs having the spacer material are then cut transversely relative to the length of the spacer strips, and the slabs having the glass are cut along the same transverse dimension thereby providing ferrite blocks with one dimension that is close to the overall height of the finished transducer.

Each ferrite block having the spacer strips is fused to a ferrite block having a layer of glass under very high pressure, thus causing the two blocks to settle together against the spacer material, thereby forcing the melted glass that is present in excess to flow out from between the blocks. The blocks are thus joined at the surfaces carrying the spacer and glass material respectively, thereby forming a magnetic body having a nonmagnetic layer disposed in a substantially central plane therein that will serve as the nonmagnetic gaps of several magnetic transducers or heads. The joined block assembly has portions cut back to provide a smaller surface for contacting a magnetic tape that will cooperate with such surface during the recording or reproducing modes. The block assemblies are then partitioned into transducer size units by cutting along the lines of the spacer strips thereby entirely eliminating the spacer material. Thus, a plurality of unitary or integral transducer units in the form of fused ferrite block portions, each having a nonmagnetic gap material of glass centrally secured therein that forms a molecular bond with the ferrite, are provided ready for further machining to a desired shape.

To accommodate an energizing coil such as is conventionally used with magnetic transducers, an aperture is formed in the transducer unit along the plane of the rigid gap material through a portion thereof close to the effective gap face at a predetermined location. The effective gap face or front gap surface is defined as that surface which the magnetic tape traverses during operation of the magnetic tape apparatus. In contrast to the rear gap surface that is not employed directly in the transducing process. Thus, a high reluctance magnetic path is provided by disposition of the aperture adjacent to the effective gap.

The transducer is then tapered to a wedge-like shape converging from the rear gap surface to the front gap surface so that the width of the effective gap, i.e., the dimension of the surface of the front gap perpendicular to the longitudinal movement of the tape, corresponds closely to the width of the tape track to provide enhanced sensitivity by virtue of the large rear gap area as compared to the front gap area, thereby providing a considerably lower rear gap reluctance than would exist if the entire transducer were constant in thickness. However, since the width of the rear gap surface is maintained substantially larger, additional structural strength is provided for the transducer assembly. After tapering of the transducer unit, the energizing coil is coupled to the transducer.

The finished transducer assembly having the wedge shape is then joined by means of an assembly jig to a nonmagnetic mounting shoe having a cooperating wedge-like cutout. The shoe is precisely positioned on a rotary drum assembly of a magnetic tape apparatus in a similar relation as when positioned on the jig so that the transducer becomes fixed on the drum whereby only a predetermined gap portion projects from the drum periphery for contact with a magnetic medium or tape. When a plurality of shoe mounted transducers are assembled to the rotary drum, the precision mounting of transducer to shoe and shoe to drum assures that all the transducer front gap faces protrude substantially the same amount from the periphery of the drum along a radial direction. Furthermore, simple means are provided to adjust the quadrature or phasing relation of the transducers, and once such adjustment is made, such relation remains fixed during operation for practical purposes.

The invention will be described in greater detail with reference to the drawing in which.

Figure 1:
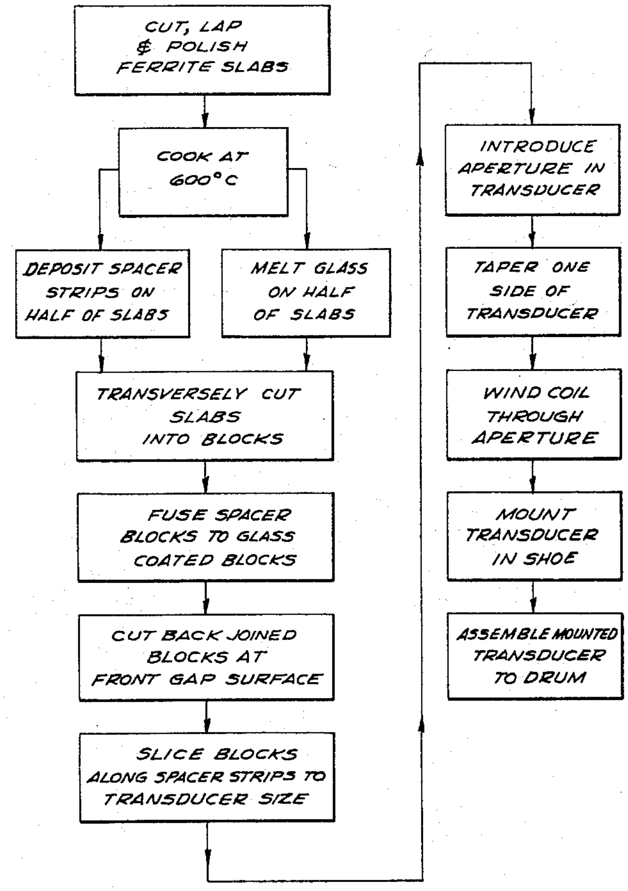
FIGURE 1 is a flow chart setting forth various steps of the inventive method.

To aid in the explanation of the invention, the following letters will be used hereinafter as follows:

*t*—the overall length of the transducer unit in the direction of tape travel

*f*—the width of the front gap surface that is perpendicular to the direction of the moving tape, and that approximates the width of a tape track that will cooperate with the transducer during record of reproduce operation

*r*—the width of the rear gap surface that is parallel to the dimension *f*

*h*—the height of the transducer unit measure from the effective gap face or front gap surface to the rear gap surface, and orthogonally to both surfaces Similar numerals and designations refer to similar elements throughout the drawing.

Figure 2:
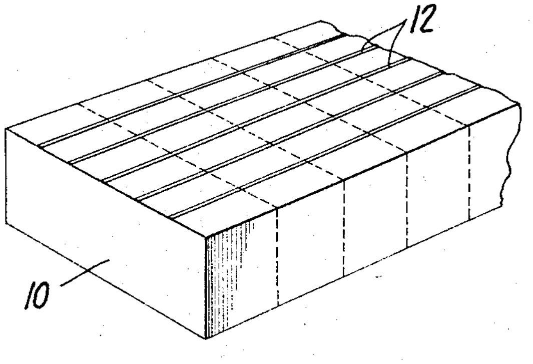
FIGURE 2 is a perspective view of a cut and polished ferrite slab having space; layers deposited thereon, in accordance with the invention.

In accordance with an embodiment of the invention, a ferrite body that may be formed from a ferrite material is cut, parallel lapped into several rectangular slabs, and one longitudinal surface of each slab is polished to a specular finish under a high pressure of about 60–100 lbs. per square inch on an optically smooth surface. As indicated in the flow chart of FIGURE 1, the ferrite slabs are heated or "cooked" at about 600° centigrade to remove undesirable contaminants. Thereafter, one half of the slabs 10 have a series of evenly spaced parallel linear layers of spacer material 12 deposited thereon, as shown in FIGURE 2. The thickness of the slab 10 may be about one half of the desired overall length, *t*, of the finished transducer, *t* being about .250 inch. The spacer material 12 may be silicon monoxide or aluminum oxide, for example, that has been deposited by evaporation, spraying, or other known methods for depositing a precise thickness of material. Each spacer strip 12 may be approximately .008 inch wide and approximately 80 micro-inches deep, by way of example, such layer thickness being instrumental in determining the ultimate effective gap length. The spacing between each of the strips may be .046 inch, for example, such dimension serving to determine the approximate extent of *r*, the rear gap surface, and also to limit the width, *f*, of the effective front gap surface.

Figure 3:
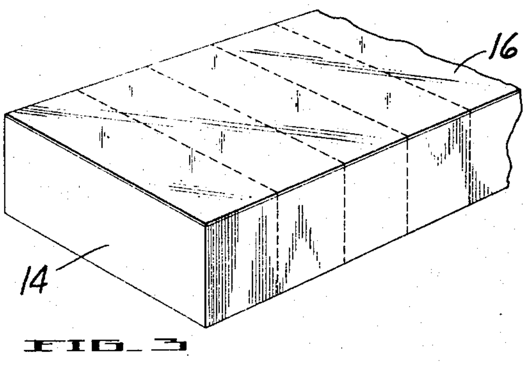
FIGURE 3 is a perspective view of a cut and polished ferrite slab having a glass layer deposited thereon.

On the other half of the slabs 14, a thin glass layer 16 is deposited, as shown in FIGURE 3, coextensively on a surface corresponding to the surface of the slab 10 on which the spacer material 12 is deposited. The glass 16, which has a low melting temperature relative to the spacer material 12 and a coefficient of thermal expansion substantially the same as that of the firrite, preferably is noncorrosive, and is of such composition that the magnetic properties of the ferrite are not affected by fusion of the ferrite and glass. The glass layer 16 may be melted onto the ferrite slab 14 at about 550–900° centigrade, which temperature is sufficient to soften the glass and to cause the glass to wet the ferrite.

Figure 4:
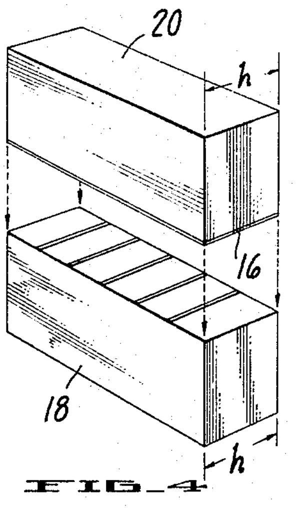
FIGURE 4 is a perspective view of two ferrite blocks cut from the slabs of FIGURES 2 and 3 respectively, and processed ready for joining.

With the slab 10 properly dimensioned, and each surface in orthogonal relationship to the adjacent surfaces, the ferrite slab 10 with the spacer material is cut transversely to the spacer strips 12 to provide blocks 18 such as shown in FIGURE 4, such blocks 18 having a dimension approximately the overall height *h* of the finished transducer. At the same time, the ferrite slab 14 is cut along the same dimension as the slab 10 to provide glass coated blocks 20, such as shown in FIGURE 4, for joining with the blocks 18.

The ferrite blocks 18 and 20 are joined by setting the glass coated block 20 onto the block 18 with the surface having the spacer lines 12 facing the corresponding surface having the glass layer 16. With the blocks 18 and 20 securely fixed relative to each other, high pressure of about 3000 lbs. per square inch may be applied when the glasss commences to soften, urging the blocks closer together until both surfaces are resting against the spacer strips. The block assembly 22 is heated in a neutral atmosphere, such as in an environment of an inert gas as argon, at a temperature between 550–900° centigrade which is sufficient to allow the excess melted glass to flow from between the blocks. The glass 16, having a relatively low melting point, flows and fills in the areas between the layers of spacer material 12, and the excesss glass is forced out from between the contiguous surfaces during the fusing process. The assembly 22 is cooled to an ambient rom temperature thereby causing the blocks 18 and 20 to be integrally joined by means of the glass bond 16 that has a thickness of approximately 80 microinches, such as determined by the thickness of the spacer material 12.

Figure 5:
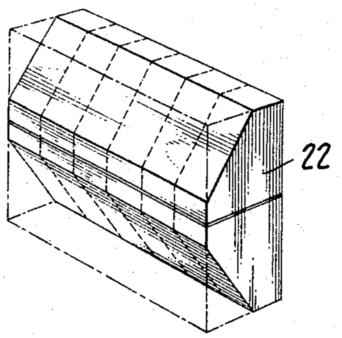
FIGURE 5 shows a joined ferrite block assembly that has been cut back, according to the invention.

The joined assembly 22 is lapped and polished, and the gap width is checked and inspected under a microscope. At this point, the assembly 22 is ground down by cutting back at about a 30° angle at each end of the front gap surface until the total area of the front gap surface is reduced in length *t* from .25 inch to about .080 inch, as indicated in FIGURE 5. The reduced front gap surface allows satisfactory unit pressure at the gap area to be obtained with a low total force between the transducer and the tape. This low total force subjects the recording medium to decreased mutilation and lessens the frictional effects thus preventing oxide deposits from building up on the transducer and providing increased tape life.

Figure 6:
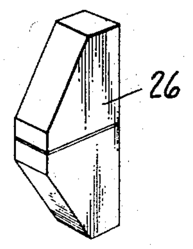
FIGURE 6 represents a transducer size ferrite unit partitioned from the assembly of FIGURE 5.

Thereafter, the joined assembly 22 is partitioned by cutting along the spacer lines 12, with a diamond saw that has a width of about .013 inch, for example, which is slightly larger than the .008 inch width of the spacer layers, thus eliminating the spacer material 12 from the ferrite assembly 22. Also, as the .008 inch wide layers are spaced at about .040 inch, the cutting operation provides gap faces, rear and front respectively, that are each about .035 inch wide. The severed units or blanks are now in a desired transducer size 26, as shown in FIGURE 6, and need only be shaped to a desired configuration and wired to serve as a magnetic recording or reproducing head.

Figure 7:
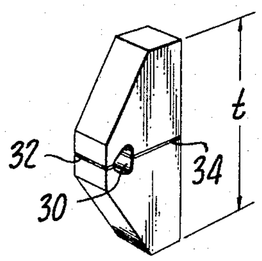
FIGURE 7 illustrates a transducer unit with an aperture formed therein.

To allow for electrical coupling of an energizing coil 28 to the transducer unit 26, an aperture 30 of about .025 inch in diameter is drilled along the plane of the glass bond 16 through the transducer unit 26, but asymmetrically relative to the front gap 32 and rear gap 34 (FIGURE 7). The aperture 30, which may be formed by ultrasonic means for example, is located preferably close to the effective front gap 30, about 0.28 inch from the aperture center to the front gap surface 24, to provide a high reluctance magnetic path adjacent thereto. The aperture 30 is preferably pear shaped to provide increased mechanical strength and reduced reluctance in the area adjacent to the front gap.

Figure 8:
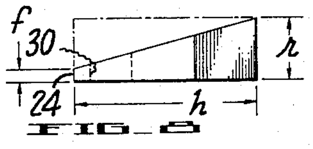
FIGURE 8 is an enlarged end view of the same transducer unit after tapering, in accordance with one aspect of the invention.
Figure 9:
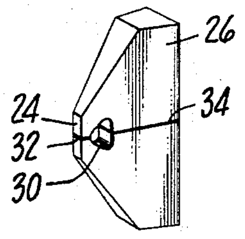
FIGURE 9 depicts the shaped transducer unit of FIGURE 8 in a front perspective view.
Figure 10:
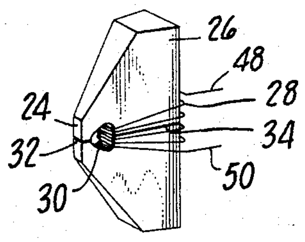
FIGURE 10 shows a shaped transducer with an energizing coil coupled thereto fabricated in accordance with the method of the invention.

In accordance with another feature of the invention, the transducer unit 26 is shaped into a wedge-like form by tapering one side from the rear gap 34 to the front gap 32 at about an angle of 14°, as illustrated by FIGURES 8 and 9. Improved sensitivity is afforded because of the ratio of the reluctance of the front gap 32 relative to that of the rear gap 34 is increased, and at the same time a strong mechanical structure is provided. The wedge type transducer 26 conforms with a rotary drum mounting shoe 36 that has an accommodating retaining cutout portion 38, such as shown in U.S. patent application 103,424. Finally, as shown in FIGURE 10, a coil 28 of insulated copper wire for transducing the processed signal, is wound through the aperture 30 and around the rear gap portion and surface of the transducer 26.

While the above description has shown, described and pointed out the fundamental novel features of the invention as applied to a preferred embodiment, it will be understood that various omissions and substitutions and changes in the form and details of the method illustrated may be made by those skilled in the art, without departing from the spirit of the invention. It is the intention, therefore, to be limited only as indicated by the scope of the following claims.

What is claimed is:

1. The method of forming magnetic transducer assemblies comprising the steps of: depositing spacer strips of material having a relatively high melting point longitudinally on a surface of a lapped and polished ferrite slab having a predetermined configuration; depositing a thin layer of glass on a corresponding surface of another polished ferrite slab, said slabs having substantially the same configuration and physical characteristics; cutting the slabs in a direction transverse to the longitudinal strips of spacer material to form blocks having desired dimensions; joining each of the blocks containing spacer material with each of the glass coated blocks in an atmosphere having a temperature of about 550–900° centigrade under high pressure to form a nonmagnetic gap layer between said formed blocks; cutting the joined assembly along the longitudinal strips of spacer material perpendicular to the joined surfaces to remove said spacer material and provide transducer size units and define sides of said units; forming an aperture along a portion of the gap layer in each of said transducer units to define front and rear gaps; and winding an electrical coil through said aperture.

2. The method of claim 1 further comprising: shaping at least one of said sides of each unit to form a planar surface extending through said front and rear gaps and inclined to the other side surface.

3. The method of forming a plurality of magnetic transducer assemblies comprising the steps of: cutting a ferrite body having high density and low porosity into a rectangular form; parallel cutting said rectangular form to provide an even number of slabs having surfaces that are disposed substantially orthogonally to each other; polishing a surface of each of said slabs to a specular finish; heating said slabs at a temperature of about 600° centigrade to eliminate contaminants therefrom; depositing parallel strips of silicon monoxide on said polished surface of each of one half of said slabs for providing spacer strips; depositing a thin glass layer coextensive with a corresponding polished surface on each of the other half of said slabs; cutting said one half of said slabs transversely to the spacer strips to provide ferrite blocks having a predetermined configuration; cutting said other half of said slabs to substantially the same configuration as that of said half of said slabs to form similar blocks; joining each block having spacer strips thereon to a block having a glass layer at a temperature between 550–900° centigrade with a pressure of about 3,000 pounds per square inch applied to urge said blocks closely together; cutting back a front gap surface of said joined block assemblies at about 30° to provide a substantially lesser area for magnetic tape contact; cutting along and removing the spacer strips of said joined assemblies to define sides and to provide transducer size units; forming an aperture in each of said transducer units through a portion of said glass gap layer and closely adjacent to said front gap surface; tapering one side of said transducer size unit from the rear gap surface to the front gap surface; and winding an electrical coil through said aperture and around said transducer unit.

References Cited by the Examiner

UNITED STATES PATENTS

| | | | |
|---|---|---|---|
| 2,431,540 | 11/1947 | Camras | 179—100.2 |
| 2,961,709 | 11/1960 | Eichbaum et al. | 29—155.6 X |
| 2,986,988 | 4/1961 | Vice | 25—155.59 |
| 3,117,367 | 1/1964 | Duinker et al. | 29—155.5 |
| 3,145,452 | 8/1964 | Camras | 29—155.57 XR |

JOHN F. CAMPBELL, *Primary Examiner.*

R. W. CHURCH, *Assistant Examiner.*